US005244194A

United States Patent [19]

Nishimura

[11] Patent Number: 5,244,194

[45] Date of Patent: Sep. 14, 1993

[54] WORK HOLDER FOR VICE

[75] Inventor: Akira Nishimura, Kanazawa, Japan

[73] Assignee: Kabushiki Kaisha Nishimura Jig, Kanazawa, Japan

[21] Appl. No.: 923,538

[22] Filed: Aug. 3, 1992

[51] Int. Cl.[5] ........ B23Q 1/04

[52] U.S. Cl. ........ 269/155; 269/271; 269/277; 269/282

[58] Field of Search ........ 269/271, 277, 134, 136, 269/282, 283

[56] References Cited

U.S. PATENT DOCUMENTS

| | | | |
|---|---|---|---|
| 2,740,310 | 4/1956 | Larsen | 269/136 |
| 3,982,740 | 9/1976 | Gutman | 269/155 |
| 4,216,950 | 8/1980 | Mason et al. | 269/271 |
| 4,573,669 | 3/1986 | Gerry | 269/271 |
| 4,582,306 | 4/1986 | Sassenberg | 269/138 |
| 4,923,186 | 5/1990 | Durfee, Jr. | 269/271 |
| 4,953,840 | 9/1990 | Nishimura | 269/282 |
| 5,033,724 | 7/1991 | James | 269/136 |

*Primary Examiner*—Robert C. Watson
*Attorney, Agent, or Firm*—Oblon, Spivak, McClelland, Maier & Neustadt

[57] ABSTRACT

A pair of slide plates are vertically displaceably fixed to the opposed front surfaces of a fixed jaw and a movable jaw constituting a vice. An arbitrary number of presser members for pressing a work are fixed on the upper surfaces of the fixed jaw and the movable jaw. The work is placed on upper ends of the slide plates adjusted in height, and a pressure from setscrews of the presser members is applied to the upper surface of the work. Accordingly, even when the work is a thin plate-shaped work, it can be stably held to prevent possible vertical curving of the work.

10 Claims, 9 Drawing Sheets

WORK HOLDER FOR VICE

BACKGROUND OF THE INVENTION (1) Field of the Invention

The present invention relates to a work holder for a vice which can securely hold a work even though the work is much smaller in size than a fixed jaw and a movable jaw of the vice.

(2) Description of the Related Art

A vice is known as an auxiliary tool for holding a work between a fixed jaw formed at one end of a base and a movable jaw provided on an upper surface of the base so as to be movable toward and away from the fixed jaw. While the work is held between the fixed jaw and the movable jaw by moving forward the movable jaw, the work must be set on the vice so that the lower surface of the work is in close contact with the upper surface of the base. If the lower surface of the work is not in close contact with the upper surface of the base, the work is easily inclined with respect to the base. Accordingly, in machining the upper surface of the work, it is difficult to achieve a desired machining accuracy.

In the case that the work is small in size and the upper surface of the work cannot be projected from the upper surfaces of the fixed jaw and the movable jaw in the condition where the lower surface of the work is in close contact with the upper surface of the base, it is necessary to interpose a spacer or block having a suitable size between the work and the base.

However, it has been very troublesome to prepare such a proper spacer and interpose the same between the work and the base when the work is small. Particularly in machining many kinds of works with a small amount, there has been a limit in working efficiency.

It is accordingly an object of the present invention to provide a work holder for a vice which can hold even a small work simply, stable, and accurately without using a specific spacer.

SUMMARY OF THE INVENTION

According to a first aspect of the present invention, there is provided a work holder for a vice including a fixed jaw and a movable jaw between which a work is to be held, the work holder comprising a pair of slide plates vertically displaceably fixed to the opposed front surfaces of the fixed jaw and the movable jaw, respectively, and at least one presser member slidably installed on the upper surface of the fixed jaw and/or the upper surface of the movable jaw, wherein the work is placed on upper ends of the slide plates, and a pressure from the presser member is applied to the work at a position substantially corresponding to the front surface of at least one of the slide plates.

With this construction, the slide plates are fixed to the front surfaces of the fixed jaw and the movable jaw so that the heights of the slide plates can be adjusted. Accordingly, the work placed on the upper ends of the slide plates can be adjusted in height so as to project from the upper surfaces of the fixed jaw and the movable jaw. On the other hand, a pressure is applied from the presser member to the upper surface of the work at a position substantially corresponding to the front surface of at least one of the slide plates. Accordingly, when the movable jaw is moved forth to hold the work between both the opposed slide plates, a possibility of the work being curved upwardly can be effectively prevented.

According to a second aspect of the present invention, there is provided a work holder for a vice including a fixed jaw and a movable jaw between which a work is to be held, the work holder comprising a slide plate vertically displaceably fixed to the front surface of one of the fixed jaw and the movable jaw, and a clamping member interposed between the fixed jaw and the movable jaw, wherein the work is placed on an upper end of the slide plate, and a pressure from the clamping member is applied to the work by moving forth the movable jaw to urge the clamping member against the work.

With this construction, the work placed on the upper end of the slide plate can be adjusted in height by vertically displacing the slide plate. Furthermore, a pressure is applied from the clamping member to the side surface of the work by moving forth the movable jaw to urge the clamping member against the work. Thus, the work can be stably held between the fixed jaw and the movable jaw.

In the first aspect of the present invention, the slide plates may be fixed through a pair of spacer plates to the front surfaces of the fixed jaw and the movable jaw. Similarly, in the second aspect of the present invention, the slide plate may be fixed through a spacer plate to the front surface of either the fixed jaw or the movable jaw.

Other objects and features of the invention will be more fully understood from the following detailed description and appended claims when taken with the accompanying drawings.

DETAILED DESCRIPTION OF THE PREFERRED EMBODIMENTS

There will now be described some preferred embodiments of the present invention with reference to the drawings.

Figure 1:
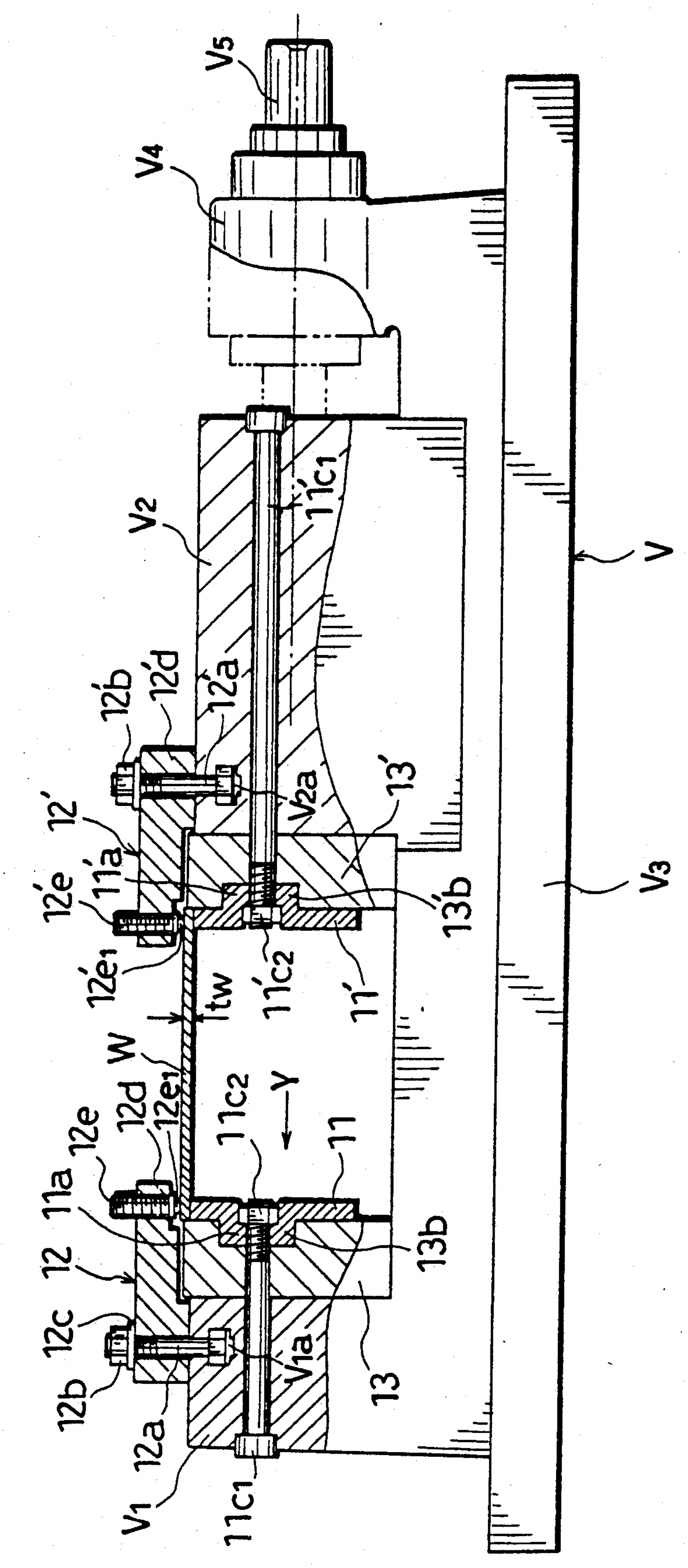
FIG. 1 is a partially sectional side view of a vice having a work holder according to the first preferred embodiment of the present invention.
Figure 2:
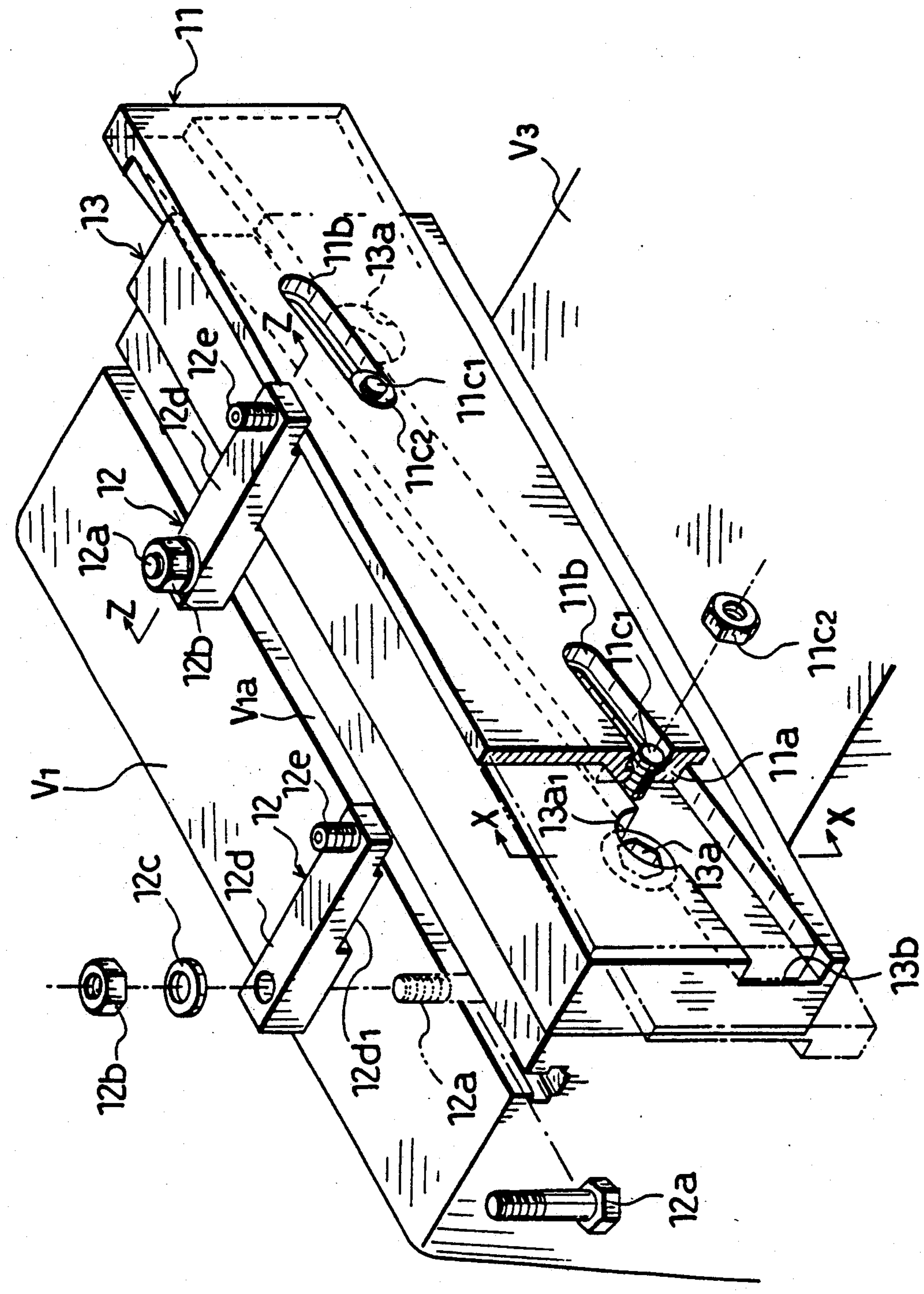
FIG. 2 is an exploded perspective view of an essential part of the work holder on a fixed jaw side shown in FIG. 1.

Referring to FIGS. 1 and 2 which show the first preferred embodiment of the present invention, the work holder is provided with a pair of slide plates 11 and 11' and a plurality of presser members 12 and 12'. The slide plate 11 and the presser members 12 are installed on a fixed jaw $V_1$ of the vice V, and the slide plate 11' and the presser members 12' are installed on a movable jaw $V_2$ of the vice V.

The vice V is of a known type such that the fixed jaw $V_1$ is formed at one end of a base $V_3$ and that the movable jaw $V_2$ is slidably installed on the upper surface of the base $V_3$ in opposition to the fixed jaw $V_1$ so as to be movable back and forth (i.e., in right and left directions as viewed in FIG. 1). A stand $V_4$ is formed at the other end of the base $V_3$, and a feed screw shaft $V_5$ extends through the stand $V_4$ into the movable jaw $V_2$, so that the movable jaw $V_2$ can be moved by rotating the feed screw shaft $V_5$. The movable jaw $V_2$ is slidable back and forth relative to the base $V_3$ through a sliding mechanism not shown.

Figure 3:
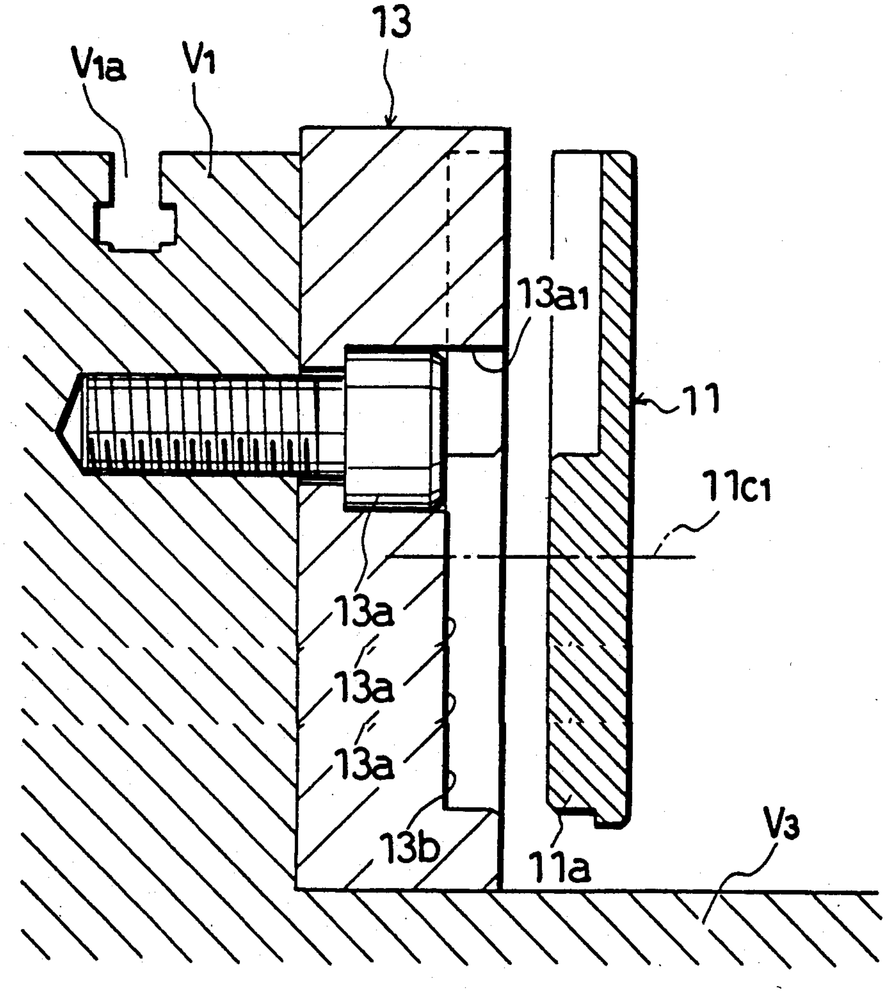
FIG. 3 is an enlarged cross section taken along the line X—X in FIG. 2.

The slide plate 11 on the left side as viewed in FIG. 1 is fixed through a spacer plate 13 to the front surface (i.e., a right-hand surface as viewed in FIG. 1) of the fixed jaw $V_1$. As shown in FIGS. 1, 3, 6 and 7, the spacer plate 13 is a rectangular plate member having a size such that the upper end surface thereof slightly projects from the upper end surface of the fixed jaw $V_1$ and that opposite side end surfaces slightly project from opposite side end surfaces of the fixed jaw $V_1$. As shown in FIGS. 1 and 3, the lower end surface of the spacer plate 13 is in contact with the base $V_3$, and as shown in FIGS. 2 and 3, the spacer plate 13 is fixed to the front surface of the fixed jaw $V_1$ by means of two bolts **13*a*. As shown in FIG. 2, the front surface of the spacer plate 13 is formed with a U-shaped groove 13*b* extending over the length thereof at a gently inclined angle (i.e., the right side as viewed in FIG. 2 being raised). Further, as shown in FIGS. 2 and 3, the spacer plate 13 is formed with two bolt holes $13a_1$ for respectively receiving the two bolts 13*a* so that front openings of the bolt holes $13a_1$ are exposed to the U-shaped groove 13*b*. The bolt holes $13a_1$ are stepped so that head portions of the bolts 13*a* are sunk under the bottom surface of the U-shaped groove 13*b***.

As shown in FIGS. 1 to 3, the slide plate 11 is a rectangular plate member somewhat longer and wider than the spacer plate 13. The rear surface of the slide plate 11 (i.e., the surface facing the spacer plate 13) is formed with an elongated projection **11*a* extending over the length thereof at a gently inclined angle according with the inclined angle of the U-shaped groove 13*b* of the spacer plate 13. Thus, the elongated projection 11*a* of the slide plate 11 is slidably engaged with the U-shaped groove 13*b* of the spacer plate 13. The slide plate 11 is formed with two elongated through holes 11*b* extending in parallel to the elongated projection 11*a*. The elongated through holes 11*b* are stepped in a thickness direction of the slide plate 11 so as to respectively receive two bolts $11c_1$ and two nuts $11c_2$. The two bolts $11c_1$ are inserted from the rear side (i.e., the left side as viewed in FIG. 1) of the fixed jaw $V_1$ through the fixed jaw $V_1$, the spacer plate 13 and the slide plate 11 at the elongated through holes 11*b*. Thus, as shown in FIGS. 1 and 2, the slide plate 11 is fixed to the front surface of the spacer plate 13** by means of the bolts $11c_1$ and the nuts $11c_2$.

Figure 4A:
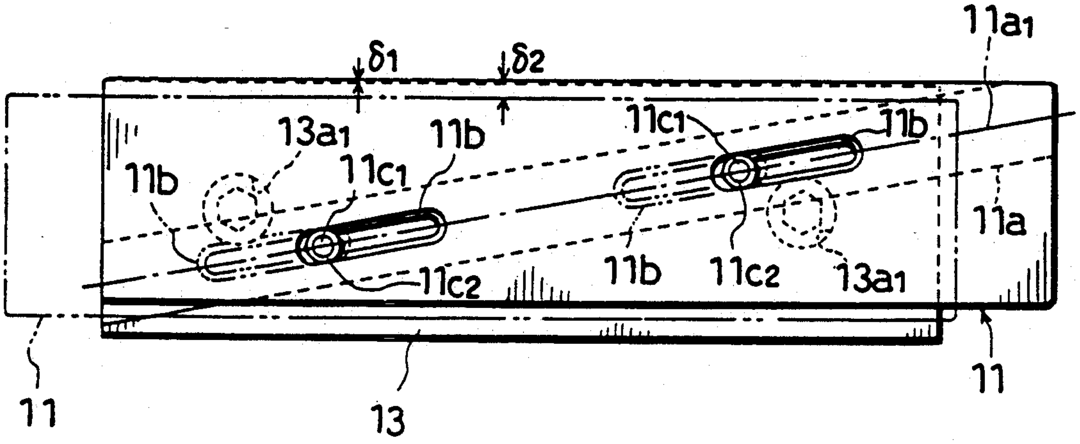
FIG. 4A is an elevational view taken from the arrow Y in FIG. 2, illustrating the operation of a slide plate.

As shown in FIG. 4A, inclination of a center line $11a_1$ of the elongated projection **11*a* is somewhat gentler than that of a phantom diagonal line of the slide plate 11. As the elongated projection 11*a* of the slide plate 11 is slidably engaged with the U-shaped groove 13*b* of the spacer plate 13, the slide plate 11 can be adjusted in height by loosening the bolts $11c_1$ and the nuts $11c_2$ and moving the slide plate 11 in a longitudinal direction thereof (i.e., in a right or left direction as viewed in FIG. 4A) within the range corresponding to the length of each elongated through hole 11*b* of the slide plate 11**.

Figure 4B:
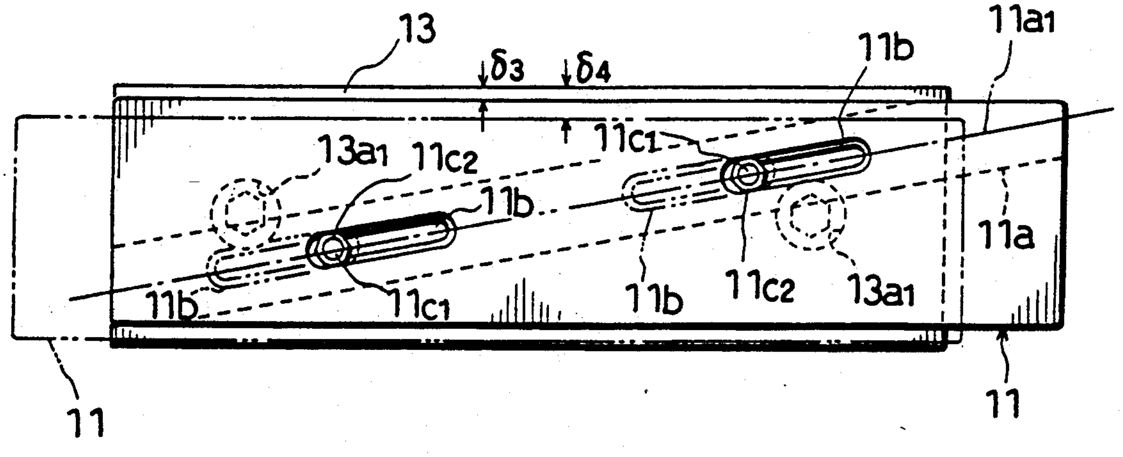
FIG. 4B is a view similar to FIG. 4A, in the case that the slide plate is turned upside down.

As shown in FIG. 4A, the slide plate 11 can be vertically travelled between a raised position where the upper end of the slide plate 11 (shown by a solid line in FIG. 4A) is higher by $\delta_1$ than an upper end of the spacer plate 13 (shown by a dashed line in FIG. 4A) and a lowered position where the upper end of the slide plate 11 (shown by a two-dotted chain line in FIG. 4A) is lower by $\delta_2$ than the upper end of the spacer plate 13. The slide plate 11 may be turned upside down as shown in FIG. 4B. In this case, the slide plate 11 can be vertically travelled between a raised position where the upper end of the slide plate 11 (shown by a solid line in FIG. 4B) is lower by $\delta_3$ than the upper end of the spacer plate 13 and a lowered position where the upper end of the slide plate 11 (shown by a two-dotted chain line in FIG. 4B) is lower by $\delta_4$ than the upper end of the spacer plate 13. A vertical stroke $\delta$ of the slide plate 11 is preferably set to $\delta=\delta_1+\delta_2=\delta_4-\delta_3\approx5$ (mm), and the distances $\delta_1$, $\delta_2$, $\delta_3$ and $\delta_4$ are preferably set to $\delta_1\approx0.5$ (mm), $\delta_2=\delta_3\approx4.5$ (mm), and $\delta_4\approx9.5$ (mm). Further, the relation between $\delta_2$ and $\delta_3$ may be set to $\delta_2\geqq\delta_3$.

Figure 5:
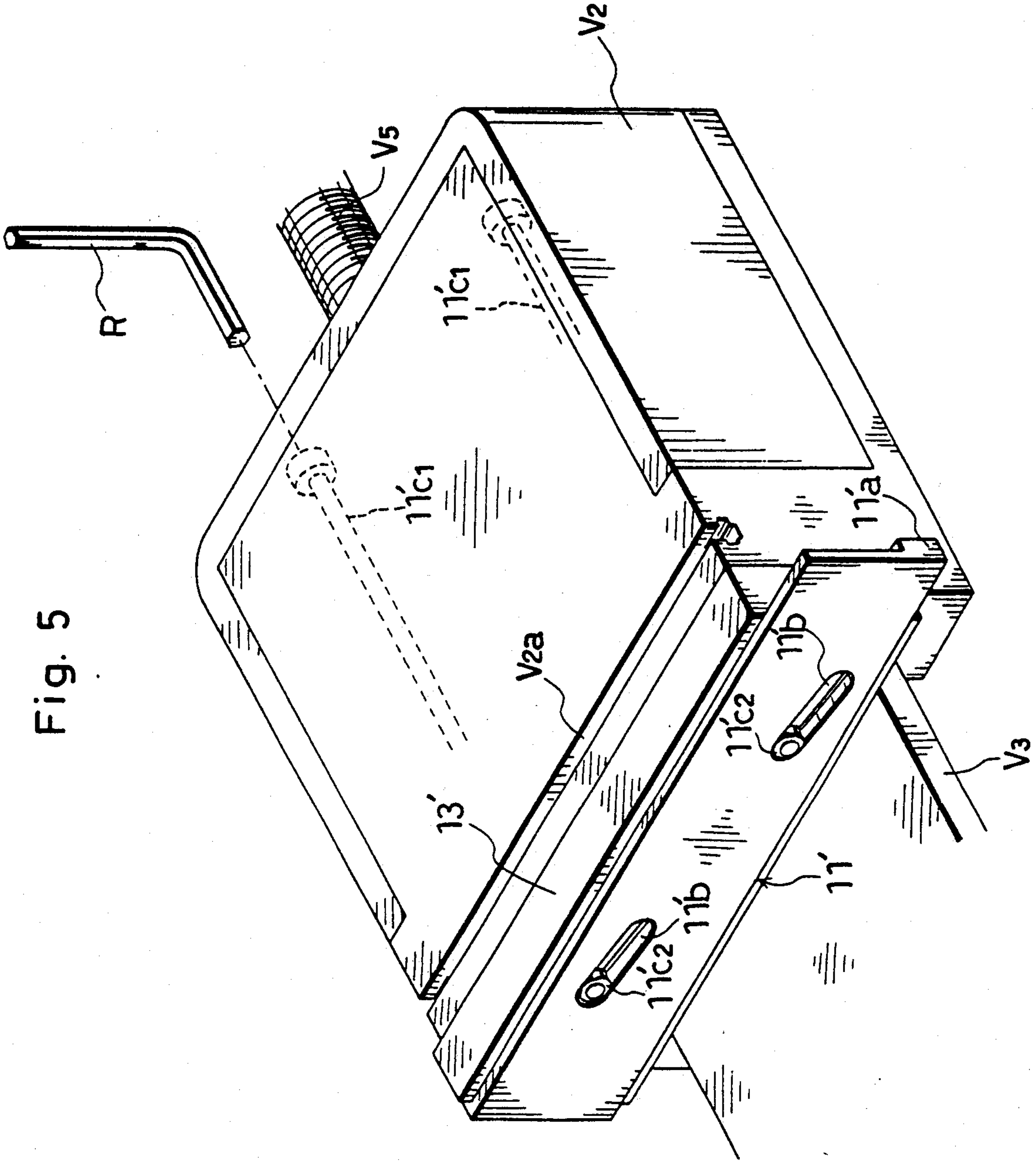
FIG. 5 is a perspective view of an essential part of the work holder on a movable jaw side shown in FIG. 1.

As shown in FIGS. 1 and 5, the slide plate 11' and the spacer plate 13' on the movable jaw $V_2$ side are identical with those on the fixed jaw $V_1$ side. That is, the slide plate 11' is vertically displaceably fixed through the spacer plate 13' to the front surface of the movable jaw $V_2$ by means of two bolts $11'c_1$ longer than the bolts $11c_1$ and two nuts $11'c_2$. The bolts $11'c_1$ may be rotated by means of a bent hexagon wrench R, for example, as shown in FIG. 5.

As shown in FIGS. 1, 2, 5 and 6, the upper surface of the fixed jaw $V_1$ is formed with a T-shaped groove $V_{1a}$ extending over the transverse length thereof, and the upper surface of the movable jaw $V_2$ is similarly formed with a T-shaped groove $V_{2a}$ extending over the transverse length thereof. Two bolts **12*a* are movably inserted in the T-shaped groove $V_{1a}$ of the fixed jaw $V_1$, and two bolts 12'*a* are also movably inserted in the T-shaped groove $V_{2a}$ of the movable jaw $V_2$. Thus, the presser members 12 are slidably installed on the upper surface of the fixed jaw $V_1$ by means of the bolts 12*a* and nuts 12*b* through washers 12*c*, and the presser members 12' are similarly slidably installed on the upper surface of the movable jaw $V_2$ by means of the bolts 12'*a* and nuts 12'*b* through washers 12'*c***.

Figure 6:
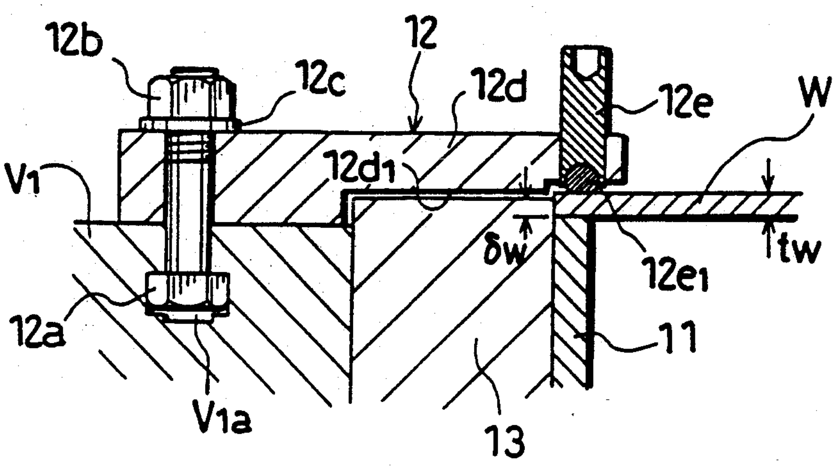
FIG. 6 is an enlarged cross section taken along the line Z—Z in FIG. 2.
Figure 7:
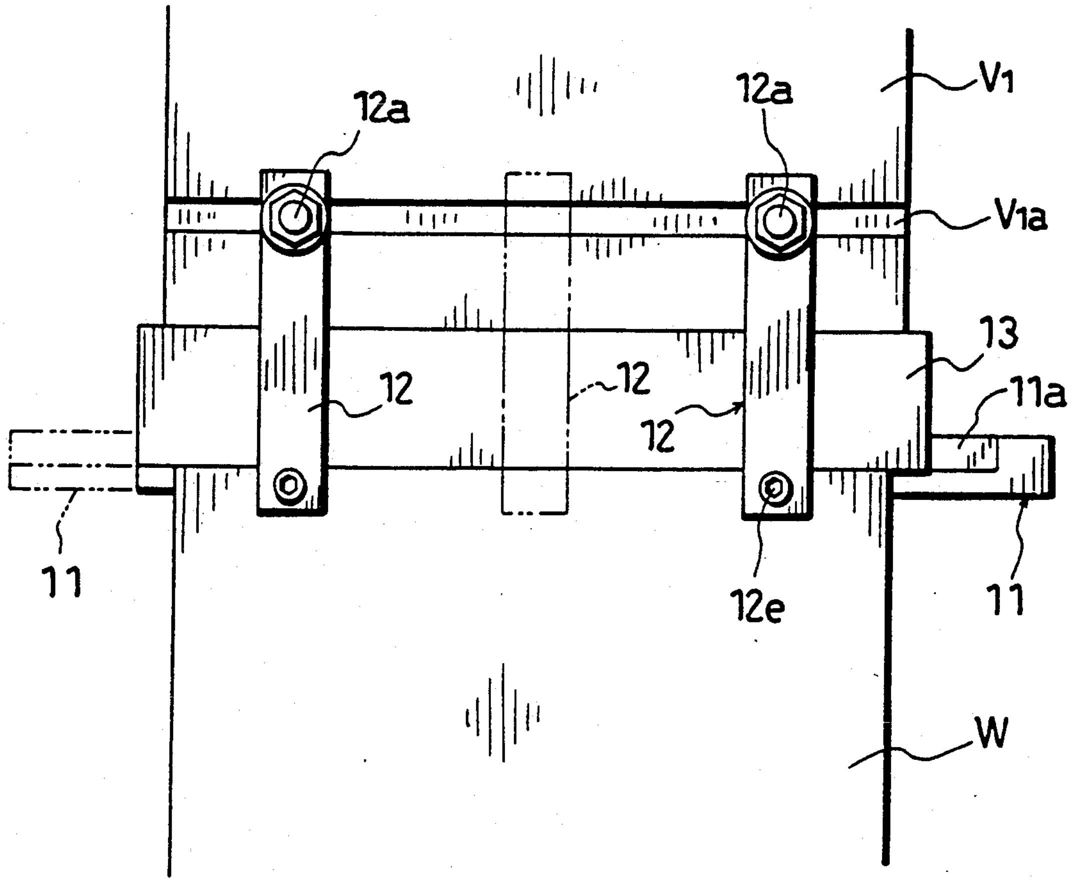
FIG. 7 is a top plan view of the essential part of the work holder on the fixed jaw side, illustrating an operational condition of the work holder.

As shown in FIG. 6, a setscrew **12*e* is threadedly engaged with a front end portion of an arm 12*d* of each presser member 12 (i.e., a right end portion of the arm 12*d* as viewed in FIG. 6). The arm 12*d* is fixed at a rear end portion thereof (i.e., a left end portion as viewed in FIG. 6) to the upper surface of the fixed jaw $V_1$ by the bolt 12*a* and the nut 12*b*. The lower surface of the arm 12*d* is formed with an indent $12d_1$ for receiving an upper end portion of the spacer plate 13 projecting from the upper surface of the fixed jaw $V_1$. Further, a steel ball $12e_1$ like a ball bearing is rotatably engaged with a lower end of the setscrew 12*e*. The arm 12*d*** has a length such that the setscrew 12e is located at a position almost just above the front surface of the slide plate 11.

Each presser member 12' on the movable jaw $V_2$ side has the same construction as that of each presser member 12. That is, each presser member 12' is fixed at a rear end portion thereof to the upper surface of the movable jaw $V_2$ by the bolt 12'a and the nut 12'b. The setscrew 12'e is threadedly engaged with a front end portion of an arm 12'd of each presser member 12', and a steel ball 12'$e_1$ is rotatably engaged with a lower end of the setscrew 12'e. The arm 12'd has a length such that the setscrew 12'e is located at a position almost just above the front surface of the slide plate 11'.

In operation, when a thin plate-shaped work W is to be held by the vice V as shown in FIGS. 1 and 6, both the slide plates 11 and 11' are first adjusted to obtain the same height. At this time, the height of the slide plates 11 and 11' is set in consideration of a thickness $t_w$ of the work W so that the upper end of each of the slide plates 11 and 11' may be fixed lower by $\delta_w$ than the upper end of each of the spacer plates 13 and 13' so as to give the relation of $t_w > \delta_w$.

In this condition, the movable jaw $V_2$ is moved forth (i.e., in the left direction as viewed in FIG. 1), and the work W is partially placed on the upper ends of the slide plates 11 and 11'. Thus, the work W is temporarily set on the upper ends of the slide plates 11 and 11'. Thereafter, the setscrews 12e and 12'e of the presser members 12 and 12' are the steel balls 12$e_1$ and 12'$e_1$ into light contact with the upper surface of the work W. Then, the movable jaw $V_2$ is slightly moved forth again to clamp the work W at right and left ends thereof. Thus, the work W is horizontally held between the opposite spacer plates 13 and 13' in the vice V. In this condition, the work W is also vertically held at the opposite end portions thereof between the setscrews 12e and 12'e and the slide plates 11 and 11' so as to receive a downward pressure through the setscrews 12e and 12'e. Accordingly, there is no possibility that the work W is vertically curved so far as a clamping force of the movable jaw $V_2$ is not so large.

In the above operation, the presser members 12 and 12' are moved to arbitrary positions along the T-shaped grooves $V_{1a}$ and $V_{2a}$, and they are fixed apart from a working position in the work W.

In this preferred embodiment, the two presser members 12 are provided on the fixed jaw $V_1$ side (see solid lines in FIG. 7), and the two presser members 12' are provided on the movable jaw $V_2$ side. However, when the thickness $t_w$ of the work W is sufficiently large to ensure a large rigidity, or a width of the work W is small, for example, a single pressure member may be provided on the fixed jaw $V_1$ side at a central position of the width of the work W (see a two-dotted chain line in FIG. 7). and a single pressure member may be similarly provided on the movable jaw $V_2$ side. Further, it is unnecessary to make the number of the pressure members 12 on the fixed jaw $V_1$ side equal to the number of the pressure members 12' on the movable jaw $V_2$ side. Further, either the pressure members 12 or the pressure members 12' may be removed. Thus, according to the present invention, it is essential that at least one pressure member is to be provided in the vice V.

Figure 8:
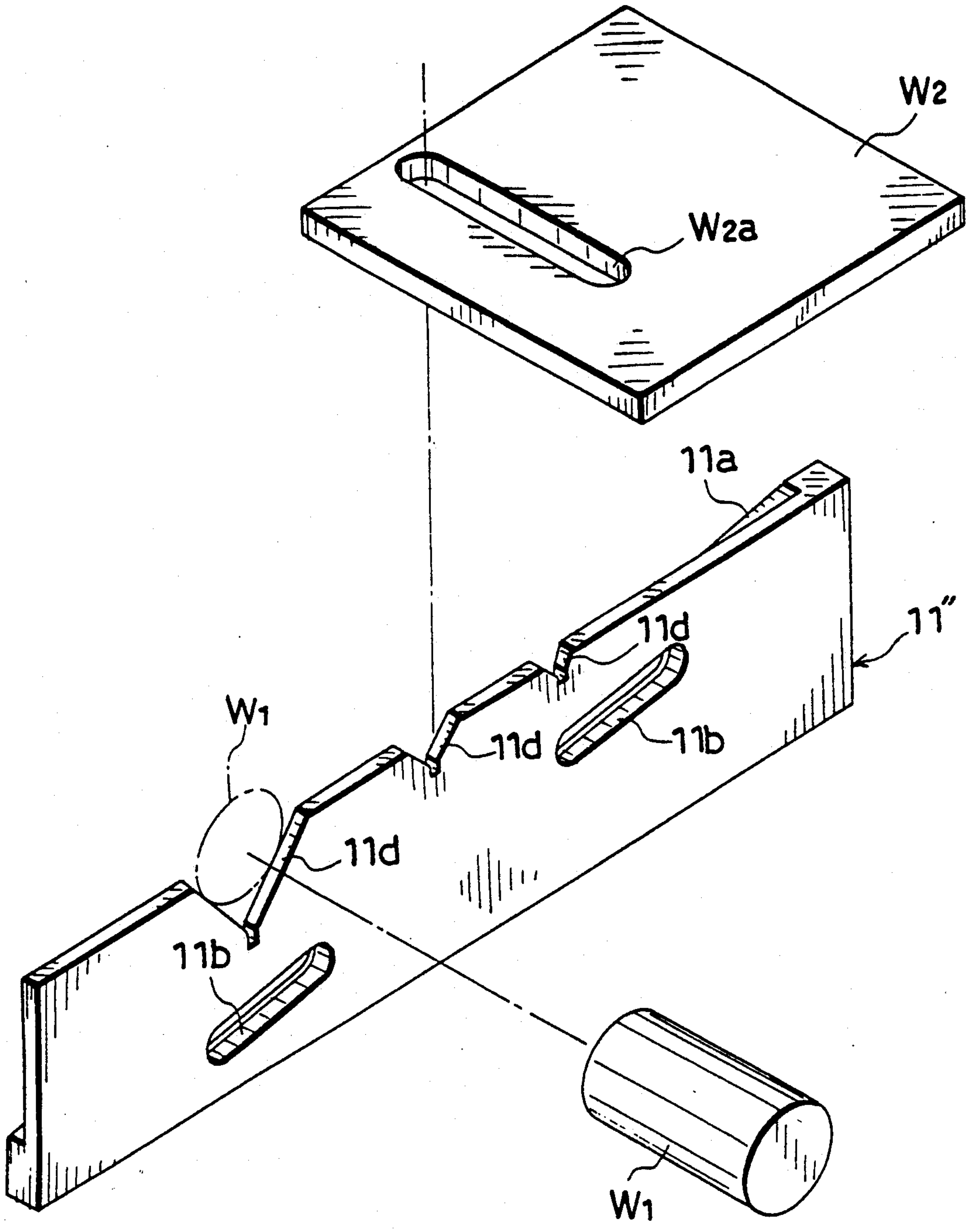
FIG. 8 is a perspective view of a slide plate according to the second preferred embodiment of the present invention.

Referring next to FIG. 8, reference numeral 11" designates a slide plate on the fixed jaw $V_1$ side according to a second preferred embodiment of the present invention. An upper end of the slide plate 11" is formed with an arbitrary number of V-shaped grooves 11d having different depths. In case of setting a round bar-shaped work $W_1$ on the upper end of the slide plate 11", a suitable one of the V-shaped grooves 11d is selected according to a diameter of the work $W_1$, and the work $W_1$ is stably set in the selected V-shaped groove 11d. Further, in case of setting a plate-shaped work $W_2$ on the upper end of the slide plate 11", the work $W_2$ is set so that a working position of an elongated hole $W_{2a}$ to be formed through the work $W_2$, for example, may be registered with any one of the V-shaped grooves 11d. Accordingly, there is no possibility that a tool for forming the elongated hole $W_{2a}$ comes into contact with the slide plate 11". In the case of the work $W_1$, one end of the work $W_1$ is kept in abutment against the front surface of the slide plate 11' or the spacer plate 13' on the movable jaw $V_2$ side.

Figure 9:
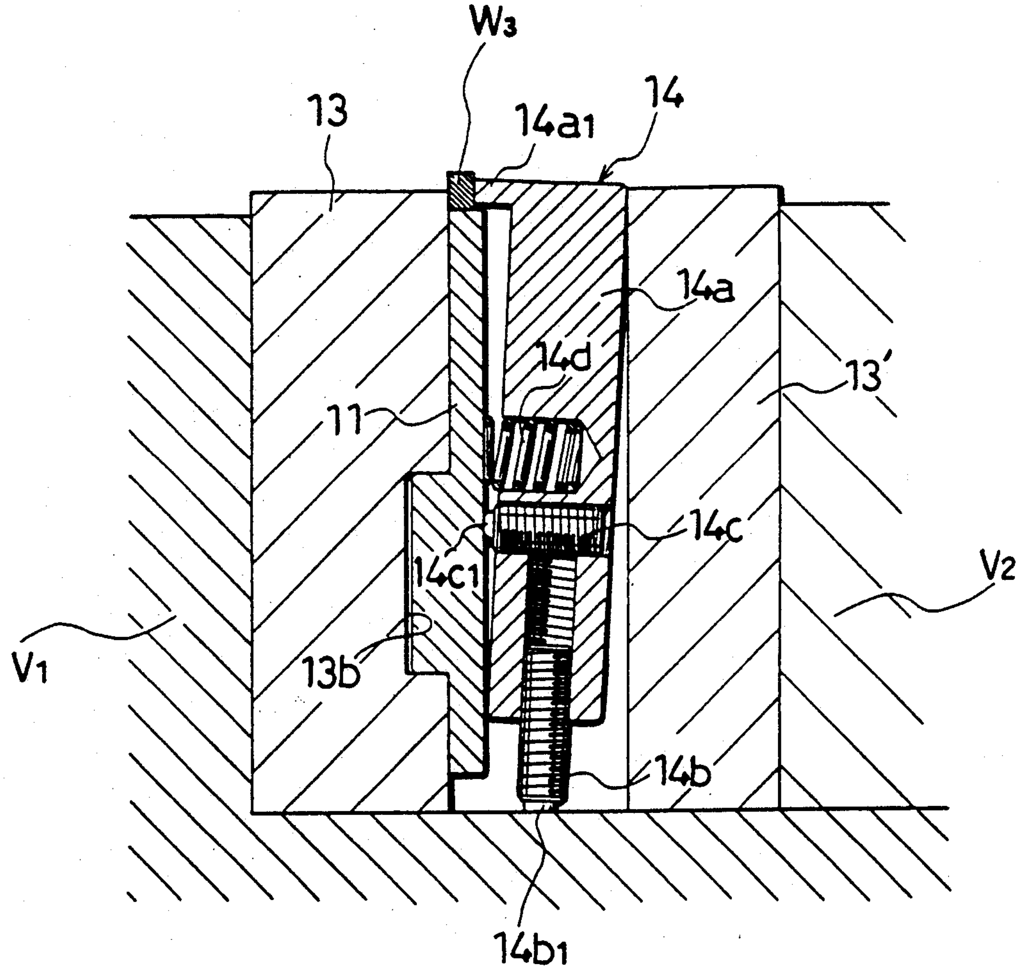
FIG. 9 is an enlarged vertical sectional view of a work holder according to the third preferred embodiment of the present invention.

Referring next to FIG. 9, there is shown a small square bar-shaped work $W_3$ is fixed by using a clamping member 14 interposed between the fixed jaw $V_1$ and the movable jaw $V_2$ according to the third preferred embodiment of the present invention.

Figure 10:
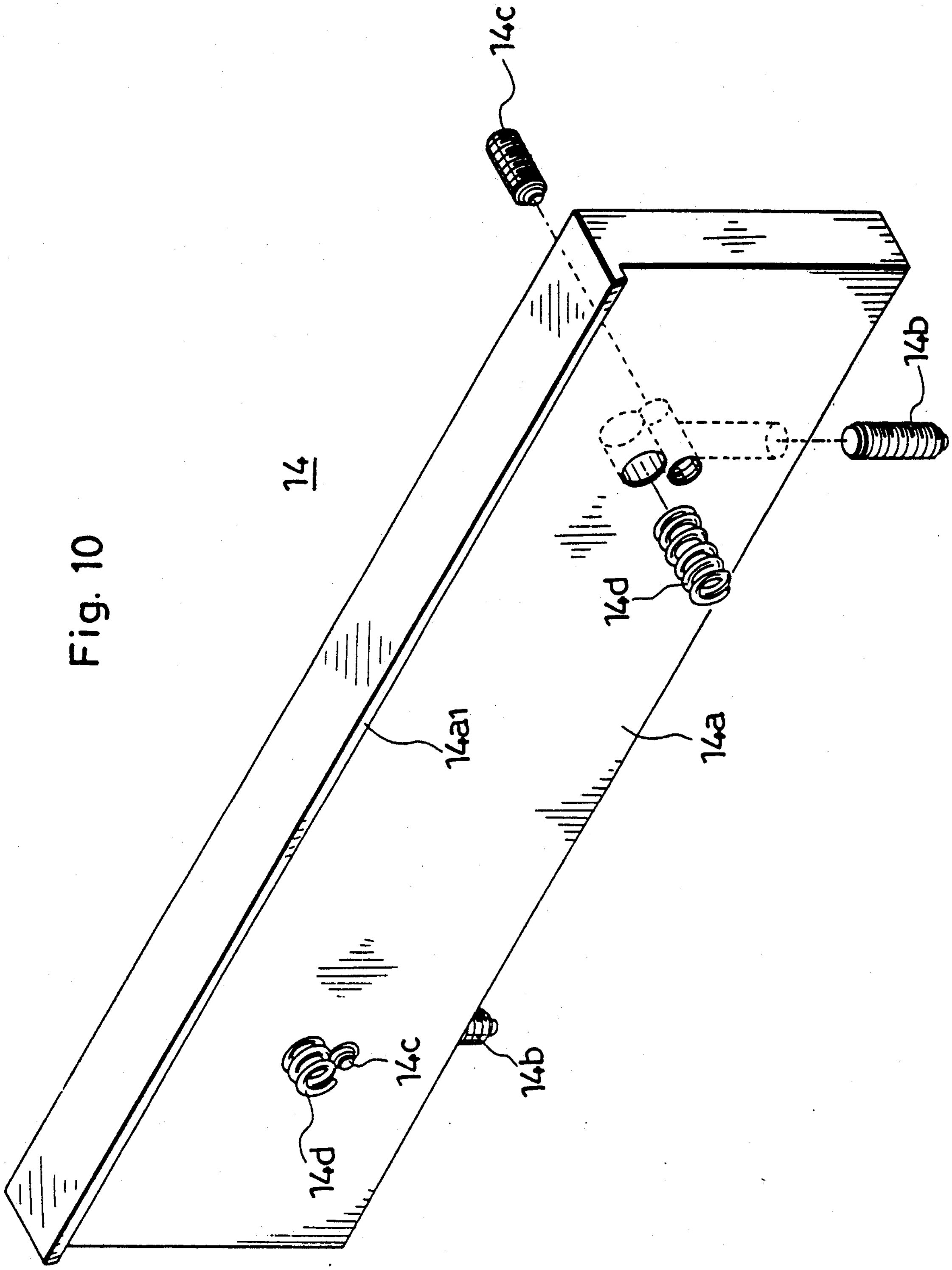
FIG. 10 is an exploded perspective view of a clamping member shown in FIG. 9.

As apparent from FIGS. 9 and 10, the clamping member 14 is constructed of a plate-shaped body 14a formed with a rib 14$a_1$ like a pent roof extending along an upper end of the body 14a and projecting from the front surface of the body 14a, two setscrews 14b threadedly inserted into the body 14a from a lower end thereof, two setscrews 14c threadedly inserted through the body 14a from the rear surface thereof, and two springs 14d inserted in holes formed on the front surface of the body 14a so as to normally project forwardly from the front surface. Further, a steel ball 14$b_1$ is rotatably engaged with a lower end of each setscrew 14b, and a steel ball 14$c_1$ is rotatably engaged with a front end of each setscrew 14c. The front end surface of the rib 14$a_1$ is slightly inclined downwardly so as to effect surface contact with the square barshaped work $W_3$.

In operation, the slide plate 11 installed on the spacer plate 13 is adjusted in height, and the work $W_3$ is placed on the upper end of the slide plate 11. Then, the lower setscrews 14b are rotated to make the rib 14$a_1$ of the body 14a face the side surface of the work $W_3$. In this condition, the movable jaw $V_2$ is moved forth to urge the clamping member 14 from the rear surface thereof and thereby make the rib 14$a_1$ abut against the side surface of the work $W_3$. Thus, a pressure is applied from the rib 14$a_1$ to the side surface of the work $W_3$. Accordingly, the work $W_3$ is stably held between the spacer plate 13 on the fixed jaw $V_1$ side and the rib 14$a_1$ of the clamping member 14. In the above operation, the inclination of the body 14a of the clamping member 14 is adjusted so that the rib 14$a_1$ may close contact the side surface of the work $W_3$ by rotating the upper setscrews 14c to adjust the length of projection from the front surface of the body 14a. Further, the springs 14d are compressed in the condition where the work $W_3$ is clamped by the rib 14$a_1$ of the clamping member 14. Accordingly, in retracting the movable jaw $V_2$ to remove the work $W_3$, the body 14a of the clamping member 14 is biased backward by the springs 14d to thereby assist the retraction of the movable jaw $V_2$. That is, it is only necessary to slightly retract the movable jaw $V_2$.

Although the work $W_3$ in this preferred embodiment has a square cross section, it may have any arbitrary cross section to be effectively clamped by the clamping member 14. Further, although the slide plate 11 is installed on the spacer plate 13 on the fixed jaw $V_1$ side in this preferred embodiment, the slide plate 11' as employed in the first preferred embodiment may be installed on the spacer plate 13' on the movable jaw $V_2$ side. In this case, the clamping member 14 is oriented reversely in respect of the horizontal direction as viewed in FIG. 9, and the U-shaped groove **13*b* of the spacer plate 13** on the fixed jaw $V_1$ side may be omitted.

In the first to third preferred embodiments, the spacer plates 13 and 13' may be omitted. In this case, the U-shaped grooves **13*b* and 13'*b* may be formed directly on the front surfaces of the fixed jaw $V_1$ and the movable jaw $V_2$, respectively. Further, the U-shaped grooves 13*b* and 13'*b* may be formed on the slide plates 11 and 11', respectively, and the elongated projections 11*a* and 11'*a* may be formed on the spacer plates 13 and 13', respectively. In the case of omitting the spacer plates 13 and 13', the U-shaped grooves 13*b* and 13'*b* may be formed on the slide plates 11 and 11', respectively, and the elongated projections 11*a* and 11'*a*** may be formed on the front surfaces of the fixed jaw $V_1$ and the movable jaw $V_2$, respectively.

As described above, according to the first aspect of the present invention, a vertical position of the work can be arbitrarily adjusted by moving the slide plate, and possible curving of the work can be prevented by the presser member. Accordingly, even when the work is a small thin plate-shaped work, it can be held in the vice simply, stably, and accurately without using a spacer used in the prior art.

According to the second aspect of the present invention, a clamping force from the clamping member can be reliably applied to the work placed on the slide plate. Accordingly, even when the work is a small bar-shaped work, it can be stably held in the vice.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A work holder for a vice including a fixed jaw and a movable jaw between which a work is to be held, said work holder comprising: a pair of slide plates vertically displaceably fixed to each opposed front surfaces of said fixed jaw and said movable jaw, respectively, and at least one presser member slidably installed on the upper surface of said fixed jaw and/or the upper surface of said movable jaw, each of said presser members comprising an arm which is fixed at one end to an upper surface of one of said jaws and projects to the other one of said jaws, a setscrew being threadedly engaged in a front end portion of said arm, wherein said work to be held is a thin plate-shaped work and is placed on upper ends of said slide plates, and a pressure from said presser member is applied to said work at a position substantially corresponding to the front surface of at least one of said slide plates.

2. A work holder for a vice including a fixed jaw and a movable jaw between which a work is to be held, said work holder comprising: a slide plate vertically displaceably fixed to the front surface of one of said fixed jaw and said movable jaw, and a clamping member interposed between said fixed jaw and said movable jaw, said clamping member comprising a plate-shaped body having a rib for abutting against said work, at least one set screw for adjusting the position of the clamping member, and a spring, wherein said work to be held is a small square bar-shaped work and is placed on an upper end of said slide plate, and a pressure from said clamping member is applied to said work by moving forth said movable jaw to urge the rib of said clamping member against said work, said spring being biased so as to assist in the retraction of the movable jaw.

3. The work holder as defined in claim 1, further comprising a pair of spacer plates, one being interposed between one of said slide plates and said fixed jaw, the other being interposed between the other slide plate and said movable jaw.

4. The work holder as defined in claim 2, further comprising a spacer plate interposed between said slide plate and one of said fixed jaw and said movable jaw.

5. The work holder as defined in claim 3, wherein the upper ends of said slide plates are slightly lower than upper ends of said spacer plates.

6. The work holder as defined in claim 4, wherein the upper end of said slide plate is slightly lower than an upper end of said spacer plate.

7. The work holder as defined in claim 3, wherein each of said slide plates is formed with a projection, and each of said spacer plates is formed with a groove engaging said projection, whereby when said each slide plate is slid on said each spacer plate along said groove, said each slide plate is vertically travelled.

8. The work holder as defined in claim 4, wherein said slide plate is formed with a projection, and said spacer plate is formed with a groove engaging said projection, whereby when said slide plate is slid on said spacer plate along said groove, said slide plate is vertically travelled.

9. The work holder as defined in claim 1, wherein the upper end of at least one of said slide plates is formed with an arbitrary number of V-shaped grooves.

10. The work holder as defined in claim 2, wherein the upper end of said slide plate is formed with an arbitrary number of V-shaped grooves.

* * * * *